United States Patent
Reasor et al.

(10) Patent No.: US 8,341,736 B2
(45) Date of Patent: Dec. 25, 2012

(54) DETECTION AND DYNAMIC ALTERATION OF EXECUTION OF POTENTIAL SOFTWARE THREATS

(75) Inventors: Sterling Reasor, Bellevue, WA (US);
Jonathan Keller, Redmond, WA (US);
Jason Joyce, Redmond, WA (US);
Ahmed Hussain, Redmond, WA (US);
Kanwaljit Marok, Seattle, WA (US);
Nizan Manor, Seattle, WA (US);
Santanu Chakraborty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 11/974,457

(22) Filed: Oct. 12, 2007

(65) Prior Publication Data

US 2009/0100520 A1    Apr. 16, 2009

(51) Int. Cl.
*G06F 21/00* (2006.01)
(52) U.S. Cl. ............ 726/22; 713/187; 713/165
(58) Field of Classification Search .......... None
See application file for complete search history.

(56) References Cited

U.S. PATENT DOCUMENTS

| | | | |
|---|---|---|---|
| 6,973,577 B1 | 12/2005 | Kouznetsov | |
| 6,973,578 B1 * | 12/2005 | McIchionc | 726/24 |
| 7,107,617 B2 | 9/2006 | Hursey et al. | |
| 7,673,341 B2 * | 3/2010 | Kramer et al. | 726/23 |
| 2005/0268112 A1 | 12/2005 | Wang et al. | |
| 2006/0123244 A1 | 6/2006 | Gheorghescu et al. | |
| 2006/0206615 A1 * | 9/2006 | Zheng et al. | 709/229 |
| 2006/0253709 A1 * | 11/2006 | Cheng et al. | 713/182 |
| 2007/0016952 A1 | 1/2007 | Stevens | |
| 2007/0022287 A1 | 1/2007 | Beck et al. | |
| 2007/0039052 A1 | 2/2007 | Chandnani | |

FOREIGN PATENT DOCUMENTS

WO    2006077443 A2    7/2006

OTHER PUBLICATIONS

Mark Russinovich, Inside On-Access Virus Scanners, Sep. 1, 1997, Penton Media Inc, Instant Doc ID 300, pp. 1-3 and Figs. 1-2.*
H. Andres Lagar, "Patagonix Dynamically Neutralizing Malware with a Hypervisor".
Hu, et al., "Secure and Practical Defense against Code-injection Attacks using Software Dynamic Translation", Date: Jun. 14-16, 2006, University of Virginia, Canada.
Inoue, Hajime, "Anomaly Detection in Dynamic Execution Environments", Date: Dec. 2005, B.S., University of Michigan, New Mexico.

* cited by examiner

*Primary Examiner* — Gilberto Barron, Jr.
*Assistant Examiner* — Izunna Okeke

(57) ABSTRACT

An arrangement for dynamically identifying and intercepting potential software threats before they execute on a computer system is provided in which a file system filter driver (called a "mini-filter") interfaces with an anti-malware service to selectively generate an alert event and allow the threat to run, in addition to generating an alert event and suspending the threat. The decision to suspend the threat or allow it to run is made through application of a cascading logic hierarchy that includes respective policy-defined actions, user-defined actions, and signature-defined actions. The mini-filter generates the alert event to the anti-malware service whenever a file is opened, or modified and closed. The service uses an engine to scan the file to identify potential threats which are handled though application of the logic hierarchy which provides for configurations defined in a lower tier of the hierarchy to be overridden by those contained in a higher tier.

13 Claims, 8 Drawing Sheets

DETECTION AND DYNAMIC ALTERATION OF EXECUTION OF POTENTIAL SOFTWARE THREATS

BACKGROUND

Spyware is one of the most vexing challenges to face computer users today. Industry analysts, corporations, government leaders, and consumer advocacy groups all identify spyware as a serious problem that threatens to undermine public trust in computing. The term spyware refers to a wide range of software programs designed to take partial control of a computer, typically without the consent of the owner or legitimate user. Spyware uses this control to generate unsolicited pop-up advertising on a computer, collect and/or communicate user's personal information and behaviors, such as Web-browsing habits, for marketing purposes, or change the configuration of a computer. Many behaviors associated with spyware are also used for legitimate purposes. For example, spyware typically starts automatically. But the same is true of antivirus and firewall software. Both can be set to start automatically when they are loaded (a feature called "autostart") and both can provide automatic updating at the user's convenience. But an important distinction between spyware and legitimate software is that legitimate software is expected to provide a clear way to turn these settings off or on, or to change them.

Identifying and analyzing spyware is also a complex challenge. New forms of spyware are constantly under development, and the same technology that can make spyware malicious and unwanted also appears in software that users want to keep and use on their computers, such as antivirus software. It is not always possible for software to determine whether a program is something the customer wants to preserve or remove. In addition, spyware-based threats to security continue to evolve, becoming more complex and sophisticated, and propagating with increasing speed. Even worse, spyware and other unwanted software have begun to employ techniques to gain access to users' computers that were once only used by software such as viruses, trojans, and other purposefully malicious software (called "malware").

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for dynamically identifying and intercepting potential software threats before they execute on a computer system is provided in which a file system filter driver (called a "mini-filter") interfaces with an anti-malware service to selectively generate an alert event and allow the threat to run, in addition to generating an alert event and suspending the threat. The decision to suspend the threat or allow it to run is made through application of a cascading logic hierarchy that includes respective policy-defined actions, user-defined actions, and signature-defined actions.

In various illustrative examples, the mini-filter generates the alert event to the anti-malware service whenever a file in an underlying file system is attempted to be opened, or modified and closed. The service uses an engine to scan the file to identify potential threats by comparing the file against a set of stored signatures and then handling the threat though application of the logic hierarchy. The logic hierarchy provides for configurations defined in a lower tier of the hierarchy to be overridden by those contained in a higher tier. This arrangement advantageously enables threats experienced by consumers and managed users in an enterprise to be managed differently as such groups have differing needs. In addition, users are provided with improved visibility and control over all the software that is capable of being run their computer systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
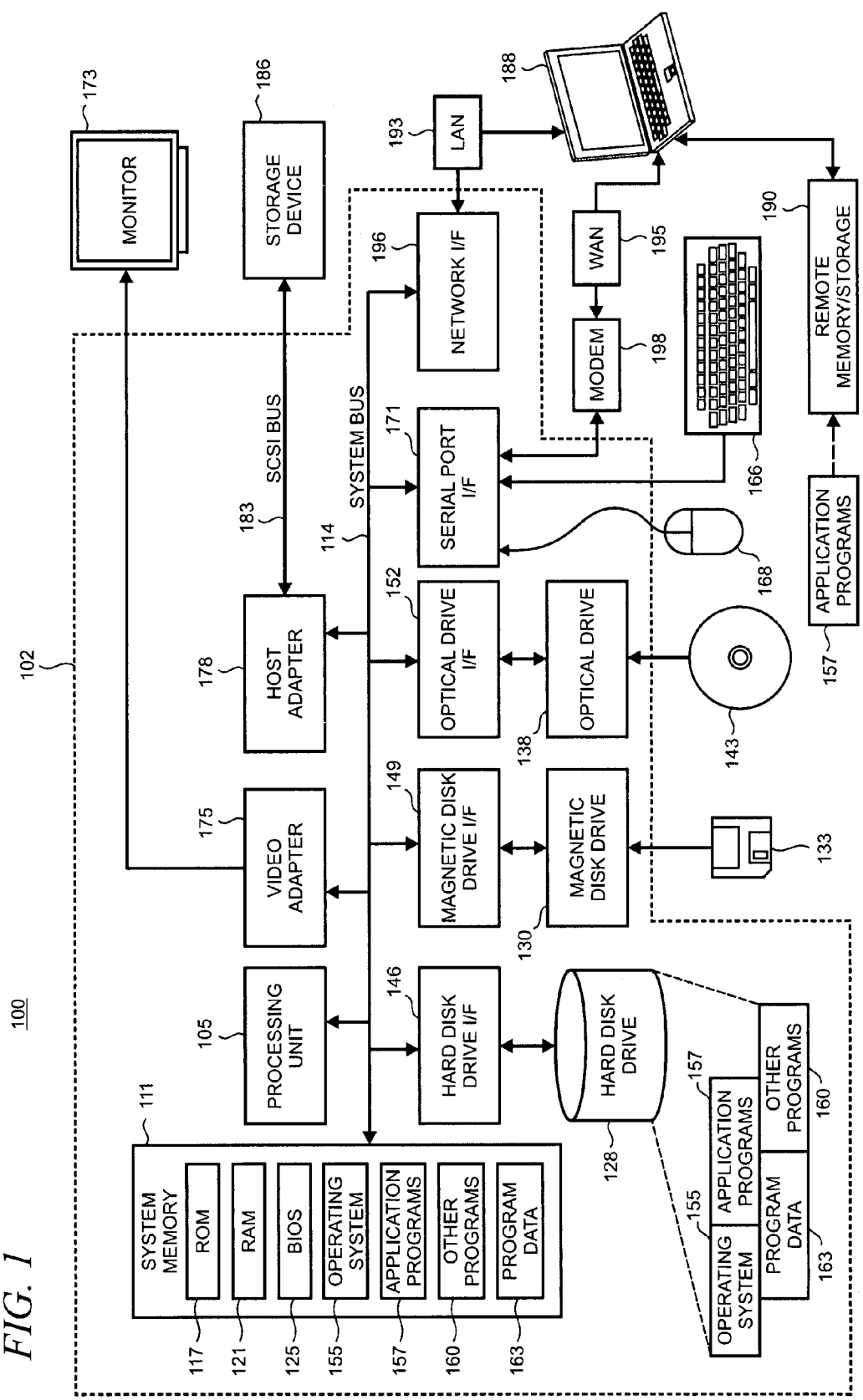
FIG. 1 is a simplified block diagram of an illustrative computing environment in which the present detection and dynamic alteration of execution of potential software threats may be implemented.

FIG. 1 is a simplified block diagram of an illustrative computing environment 100 that employs a personal computer ("PC") or server (collectively referred to as computer system 102) with which the present detection and dynamic alteration of the execution of potential software threats may be implemented. Computer system 102 includes a processing unit 105, a system memory 111, and a system bus 114 that couples various system components including the system memory 111 to the processing unit 105. The system bus 114 may be any of several types of bus structures including a memory bus or memory controller, a peripheral bus, or a local bus using any of a variety of bus architectures. The system memory 111 includes read only memory ("ROM") 117 and random access memory ("RAM") 121. A basic input/output system ("BIOS") 125, containing the basic routines that help to transfer information between elements within the computer system 102, such as during start up, is stored in ROM 117. The computer system 102 may further include a hard disk drive 128 for reading from and writing to an internally disposed hard disk (not shown), a magnetic disk drive 130 for reading from or writing to a removable magnetic disk 133 (e.g., a floppy disk), and an optical disk drive 138 for reading from or writing to a removable optical disk 143 such as a CD (compact disc), DVD (digital versatile disc) or other optical media. The hard disk drive 128, magnetic disk drive 130, and optical disk drive 138 are connected to the system bus 114 by a hard disk drive interface 146, a magnetic disk drive interface 149, and an optical drive interface 152, respectively. The drives and their associated computer readable media provide non-volatile storage of computer readable instructions, data structures, program modules and other data for the computer system 102. Although this illustrative example shows a hard disk, a removable magnetic disk 133 and a removable optical disk 143, other types of computer readable media which can store data that is accessible by a computer such as magnetic cassettes, flash memory cards, digital video disks, data cartridges, random access memories ("RAMs"), read only memories ("ROMs") and the like may also be used in some applications of the present arrangement. In addition, as used herein, the term computer readable medium includes one or more instances of a media type (e.g., one or more magnetic disks, one or more CDs, etc.).

A number of program modules may be stored on the hard disk, magnetic disk 133, optical disc 143, ROM 117 or RAM 121, including an operating system ("OS") 155, one or more application programs 157, other program modules 160 and program data 163. A user may enter commands and information into the computer system 102 through input devices such as a keyboard 166 and pointing device 168 such as a mouse. Other input devices (not shown) may include a microphone, joystick, game pad, satellite disk, scanner or the like. These and other input devices are often connected to the processing unit 105 through a serial port interface 171 that is coupled to the system bus 114, but may be connected by other interfaces, such as a parallel port, game port, or universal serial bus ("USB"). A monitor 173 or other type of display device is also connected to the system bus 114 via an interface, such as a video adapter 175. In addition to the monitor 173, personal computers typically include other peripheral output devices (not shown), such as speakers and printers. The illustrative example shown in FIG. 1 also includes a host adapter 178, a Small Computer System Interface ("SCSI") bus 183, and an external storage device 186 connected to the SCSI bus 183.

The computer system 102 is operable in a networked environment using logical connections to one or more remote computers, such as a remote computer 188. The remote computer 188 may be selected as another personal computer, a server, a router, a network PC, a peer device or other common network node, and typically includes many or all of the elements described above relative to the computer system 102, although only a single representative remote memory/storage device 190 is shown in FIG. 1. The logical connections depicted in FIG. 1 include a local area network ("LAN") 193 and a wide area network ("WAN") 195. Such networking environments are often deployed, for example, in offices, enterprise-wide computer networks, intranets and the Internet.

When used in a LAN networking environment, the computer 102 is connected to the local area network 193 through a network interface or adapter 196. When used in a WAN networking environment, the computer system 102 typically includes a broadband modem 198, network gateway or other means for establishing communications over the wide area network 195, such as the Internet. The broadband modem 198, which may be internal or external, is connected to the system bus 114 via the serial port interface 171. In a networked environment, program modules related to the computer system 102, or portions thereof, may be stored in the remote memory storage device 190. It is noted that the network connections shown in FIG. 1 are illustrative and other means of establishing a communications link between the computers may be used depending on the specific requirements of an application of database memory management.

Computer system 102, like such systems employed by users throughout the world, is potentially vulnerable to spyware, adware, and other unwanted software (collectively referred to here as Potentially Unwanted Software, or "PUS"). Spyware can be a minor annoyance, or it can have a serious impact on computer performance, security, and privacy. Common symptoms of spyware infestation include:

Advertisements pop up, even when the user is not browsing the World Wide Web;

Settings change unexpectedly and are difficult to restore. For example, the computer's Web browser home page or default search engine might change without the user's consent;

New, unwanted toolbars appear in the browser and are difficult to remove;

Performance of computer system 102 suddenly and/or dramatically slows down;

Operating systems ("OS"), Web browsers, and common applications crash more often.

Less common but potentially more harmful forms of spyware can also:

Record keystrokes (i.e., from keyboard 166) which allows the spyware to capture passwords and login information;

Collect personal information, such identification numbers, social security numbers (in the United States) or bank information, and send the information to a third party;

Take remote control of the computer system 102 to gain access to files, install or modify software, use the computer to help spread viruses, and more.

All forms of spyware are alike in this respect: they are often installed without the user's consent and user's knowledge of what they will do. However, unlike the malicious threats posed by worms, trojans and viruses, adware and spyware can be produced and distributed with legitimate business purposes in some cases. For example, adware is sometimes considered as a legitimate alternative for consumers who wish to use software free of charge in exchange for viewing advertisements while the software is being used. Thus, there can be instances when a user will affirmatively decide to allow some forms of PUS to run on their computer systems.

Current solutions to some of the problems posed by spyware include malware identification and removal tools, such as anti-virus and anti-spyware programs, that will generally run as application programs 157 on computer system 102. Many of these current solutions may use an approach by which known malicious processes are suspended from running on the computer system 102 through interaction with the file system driver that executes in the kernel of the OS (e.g., OS 155). However, while this approach may work satisfactorily with severe threats such as worms and viruses where the decision to suspend is clear, it is much less appropriate for PUS where such arbitrary suspension may interfere with the user's desired course of action.

In the present arrangement for detecting and dynamically altering execution of potential software threats, rather than apply a simple static policy that results in the suspension of potentially malicious processes, detecting and altering execution of threats posed by PUS is performed dynamically to enable users with improved visibility and control over all the software that could run on their computer systems, irrespective of the threat level and whether or not the software is PUS. Users in both consumer settings in which computer systems are used singly (or in small home networks) as well as enterprise network settings where a group of users is supported by an IT (information technology) administrator can be expected to benefit from such improved visibility and control of software.

Figure 2:
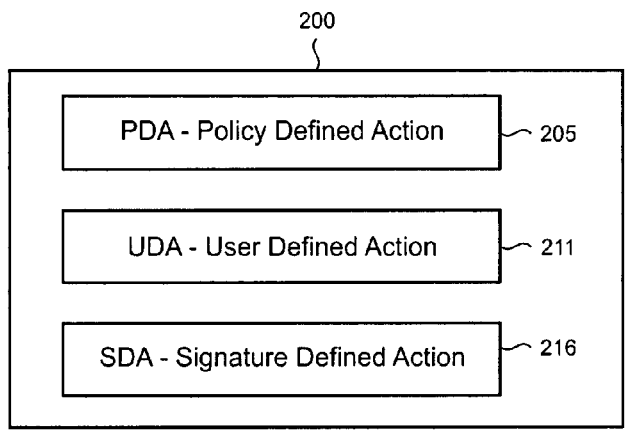
FIG. 2 shows an illustrative cascading logic hierarchy that is utilized when implementing a decision to suspend or allow a detected potential threat to run on a computer system.

As shown in FIG. 2, a cascading logic hierarchy 200 is utilized when implementing a decision to suspend or allow a detected threat to run on computer system 102 (FIG. 1). Logic hierarchy 200 provides a configuration for the computer system 102 that is utilized when handling a threat, and includes a PDA (Policy-Defined Action) component 205, a UDA (User-Defined Action) component 211, and an SDA (Signature-Defined Action) 216. Configurations defined in a lower tier of the logic hierarchy 200 can be overridden by those contained in a higher tier. Thus, the PDA 205 and UDA 211 are each capable of overriding the configuration provided by the SDA 216, while the PDA 205 can override the configuration provided by the UDA 211 and SDA 216 in a cascading manner.

Figure 3:
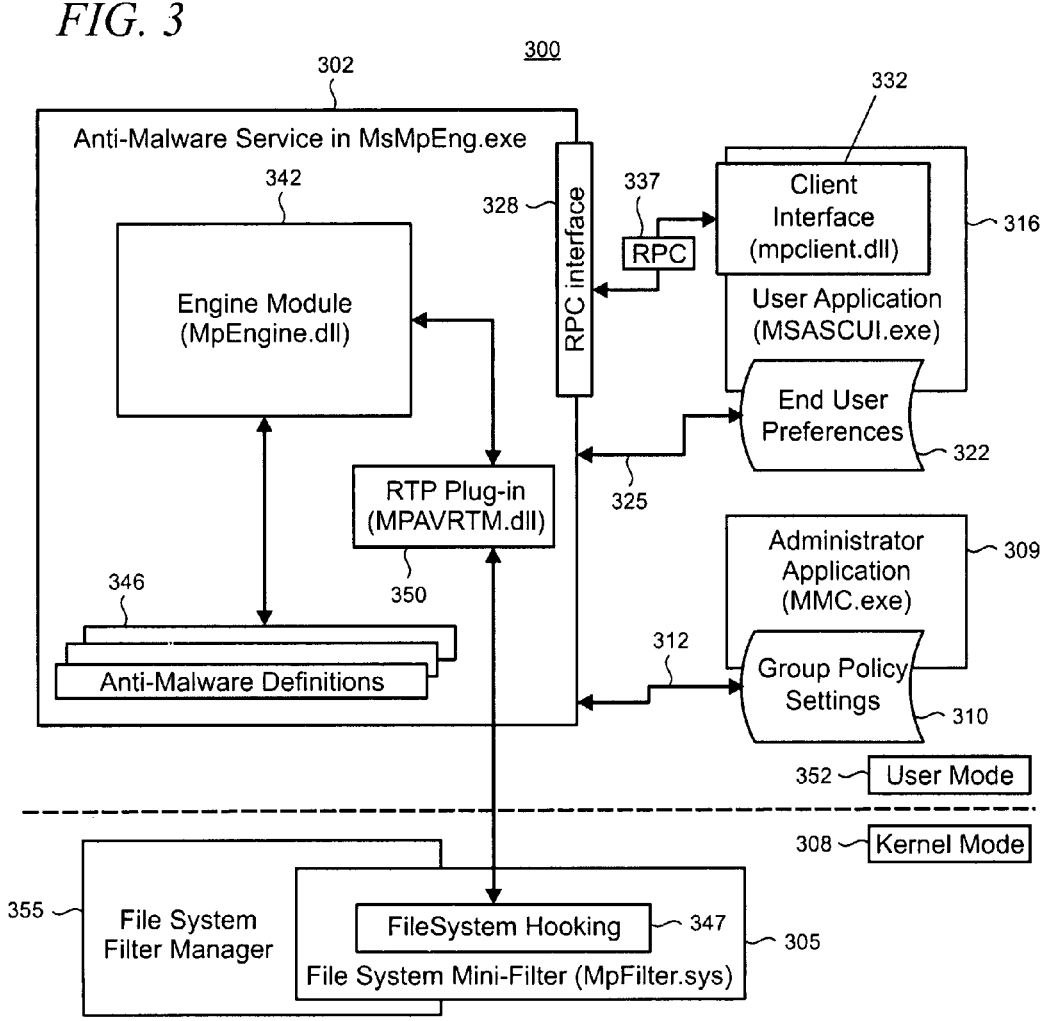
FIG. 3 shows an illustrative architecture that is implemented using a security product or operating system.

Logic hierarchy 200 is implemented, in this example, using the architecture 300 shown in FIG. 3. Architecture 300 may be alternatively implemented as part of the operating system (e.g., OS 155 in FIG. 1) such as Windows Vista™ or as part of a security product such as Windows® Defender, both published by Microsoft Corporation. Architecture 300 implements an anti-malware service 302 created during runtime of the MsMpEng.exe executable that interacts with a file system filter driver called a "mini-filter" 305 (MpFilter.Sys) in kernel mode (indicated by reference numeral 308). It is emphasized, however, that use of a Windows environment is merely illustrative and the present arrangement for detecting and dynamically altering the execution of potential software threats is not necessarily limited to such environments.

Architecture 300 includes an administrator application 309 (MMC.exe) that is configured to provide an administrator console. This enables an IT administrator to set the PDA 205 for the computer system 102 (FIG. 1) when responding to detected threats using one or more group policy settings 310. The group policy settings 310 are exposed to the anti-malware services as indicated by line 312.

A user application 316 (MSASCUI.exe) is supported by architecture 300 to provide a UI, among other features and functions. User application 316 provides the mechanism by which a user or local machine administrator defines the UDA 211 in FIG. 2 which is stored as end user preferences 322. The end user preferences 322 are exposed to anti-malware service 302 as indicated by line 325.

In Windows Vista implementations, using the User Account Control ("UAC") initiative, a remote procedure call ("RPC") interface 328 is used by the anti-malware service 302 along with a corresponding client interface 332 implemented as a Dynamic Linked Library (mpclient.dll) that is exposed to the user application 316. This implements RPC-compliant communication between the user interface and the anti-malware service (as indicated by reference numeral 337). By using RPC in UAC, a restricted environment can be established that limits the interaction between the user and the anti-malware service 302 to thereby harden the service and prevent it from performing abnormal or inappropriate activities in the file system, registry, network, or other resources through its interface with the file system.

An engine module 342 (MpEngine.dll) is used in this example to implement the anti-malware service 302 and is provided with access to the logic embodied in the SDA 216 (FIG. 2) as one or more anti-malware definitions 346. The anti-malware definitions 346 are also commonly called "signatures." The engine module 342 interfaces to the mini-filter 305 in the kernel 308 via a file system hooking component 347 and an RTP (real time protection) plug-in 350 (MPAVRTM.dll) to apply the logic from the hierarchy 200 to file operations. As shown in FIG. 3, the anti-malware service 302, administrator application 309, and user application 316 run in user mode 352.

In this example, the mini-filter 305 is a filter driver which is developed based on an existing file system filter manager 355 using the Microsoft Filter Manager development model. The file system filter manager 355 is arranged to interface with an underlying file system, such as FAT (File Allocation Table) or NTFS (New Technology File System) file systems (not shown in FIG. 3) in the Windows OS.

Under the Filter Manager development model, a file system filter driver intercepts requests targeted at a file system or another file system filter driver. By intercepting the request before it reaches its intended target, the filter driver can extend or replace functionality provided by the original target of the request. Examples of file system filter drivers include anti-virus filters, backup agents, and encryption products. Mini-filter Developers may use the IFS (Installable File System) Kit published by Microsoft Corporation, for example, to develop file systems and file system filter drivers. The mini-filter 305 in this example is adapted from the kernel mode file system driver, which is traditionally used only for virus protection, so that protection is provided against spyware, adware, and other types of potentially unwanted software.

Figure 4:
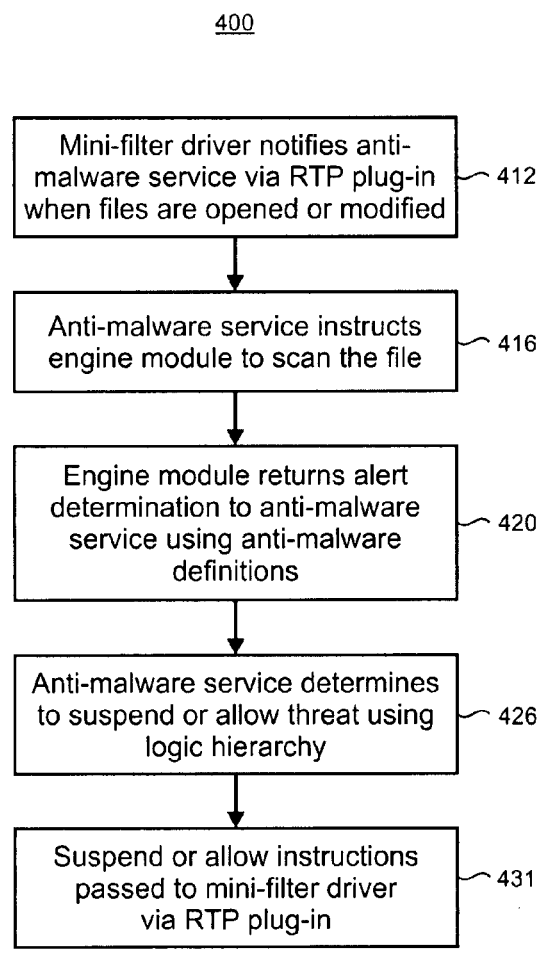
FIG. 4 is a flowchart for an illustrative method that may be performed using the architecture shown in FIG. 3.

FIG. 4 shows a flowchart for an illustrative method 400 that may be performed by architecture 300 shown in FIG. 3. At block 412 the mini-filter 305 notifies the anti-malware service 302 via the RTP plug-in 350 when files are opened, or modified and closed, by generating and sending an alert event. The anti-malware service instructs the engine module 342 to scan the file at block 416.

At block 420, the engine module 342 uses the anti-malware definitions 346 during the scan to determine whether the file presents a threat, or is PUS, and if so, at what threat or alert level (e.g., low, medium, high, severe, etc.). These levels are defined by the SDA 216 (FIG. 2). An alert level event is returned to the anti-malware service 302. The anti-malware service 302 applies the cascading logic hierarchy 200 shown in FIG. 2 to derive a decision to suspend or allow the threat, as indicated at block 426. Suspend or allow instructions are passed to the mini-filter 305 for implementation in the kernel 308.

The decision to suspend or allow the threat (made at block 426 in FIG. 4), in this illustrative example, will typically differ for consumers as compared with managed users that are part of an enterprise network such as that associated with a business or other organization. It is recognized that such groups typically have significantly different needs and operate in distinct environments. For consumers, the decision to suspend or allow is determined by the alert level of the threat. Accordingly, processes associated with more severe alerts, like viruses, are suspended from executing, while low alert processes, such as those associated with adware, are allowed to run. For enterprise managed users, the decision to suspend or allow a detected threat is customizable by the IT administrator. Here, the IT administrator may choose to couple the decision to the alert level (as is the case with consumer settings), for example, or select a removal action for a specific named threat, or threat category (e.g., malware, spyware, adware, etc.). In this case, the threat is suspended regardless of alert level to thereby over-ride an action specified by the SDA 216. The suspend or allow instructions are then passed to the mini-filter 305 via the RTP plug-in 350, as indicated by block 431 in FIG. 4.

Figure 5:
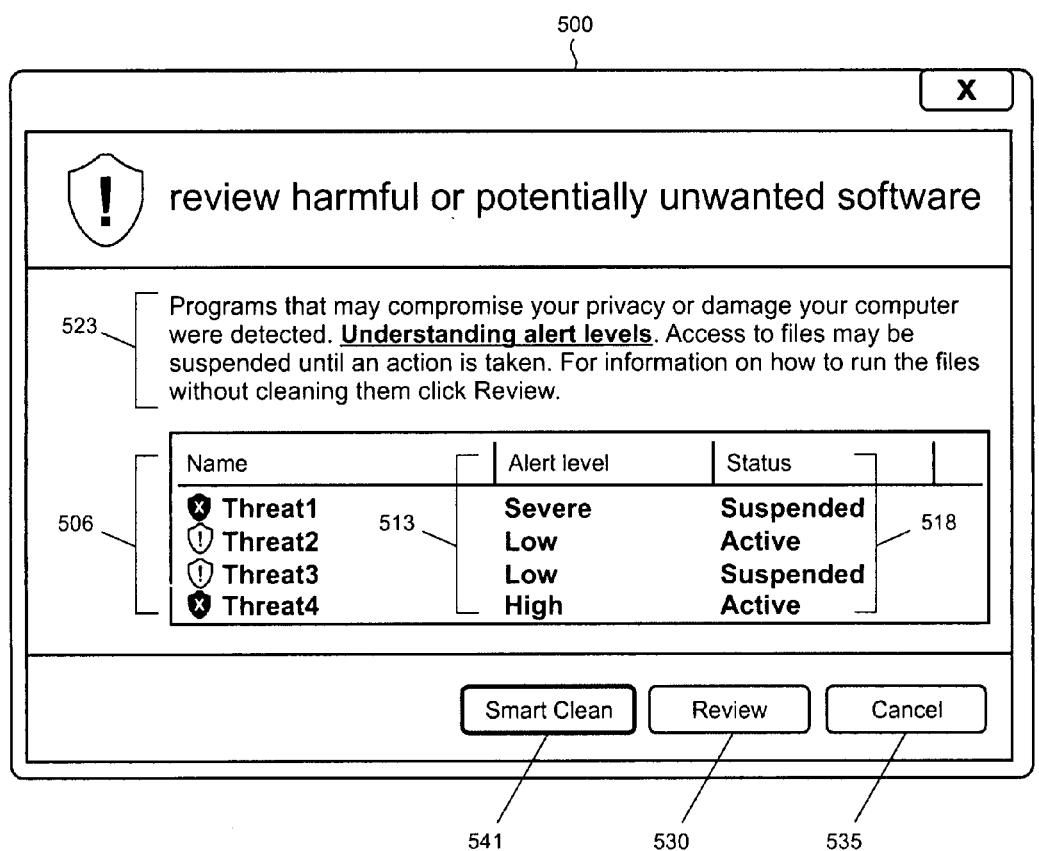
FIG. 5 is a screenshot of an illustrative user interface ("UI") that is provided by a component of the architecture shown in FIG. 3.

FIG. 5 shows a screen shot of an illustrative UI that is provided by the user application 316 shown in FIG. 3 and described in the accompanying text. The screen shot is an example of a threat dialog box 500 that is displayable by the user application 316 to provide the user of the computer system 102 with enhanced visibility and control over harmful or potentially unwanted software that is identified by the anti-malware service 302 using the method 400 described above.

Threat dialog box 500 shows a list of threats (indicated by reference numeral 506) that have been identified by the scan performed by the engine module 342. While the threats are identified by name (e.g., Threat1, Threat 2 . . . ), it is noted that names shown in FIG. 5 are arbitrarily provided for purposes of this example and that real threat names are used in actual deployments. For example, threat names can include known or popular names, or those which follow threat naming conventions supported by the security industry in general or organizations such as ICSA Labs.

A set of alerts 513 which correspond to the identified threats are also displayed in the threat dialog box 500, along with the status of either "Suspended" or "Active" (i.e., allowed to run on the user's computer) as indicated by reference numeral 518. Threat dialog box 500 also displays a description 523 that provides the user with instructions regarding the review and control of the PUS that is identified in the threat dialog box, along with the option to get additional information by clicking on the highlighted text ("Understanding Alert Levels"). The user may receive information about running the files by clicking the review button 530. The cancel button 535 closes the threat dialog box without saving changes.

A smart clean button 541 is also provided in the threat dialog box 500 and is highlighted (i.e., provided focus). When this button is activated, certain threats will be removed from the user's computer. The removal is performed in accordance with the configuration (defined by the logic hierarchy 200 shown in FIG. 2) that is operative at the time the threat dialog box 500 is displayed.

The flowcharts in FIGS. 6-9 provide several illustrative user experience scenarios for interaction with the anti-malware service 302 shown in FIG. 3. In user experience scenario 600 shown in FIG. 6, Threat1 tries to execute when the user opens or modifies a file, as indicated at block 605. In this user experience scenario, it is assumed that Threat1 is identified as a "Severe" threat by the anti-malware definitions 346, and that the SDA 216 specifies that this particular threat be removed from the user's computer, and further that the PDA 205 does not include a particular group policy that is associated with this threat.

At block 608, the mini-filter 305 suspends execution of Threat1 and generates an alert event which is passed to the anti-malware service 302. The user application 316 generates and displays an "Access Denied" message to the user, as shown at block 612. At block 618, a warning balloon is provided to the user. When clicked, as indicated by reference numeral 625, the warning balloon brings up a threat dialog box (e.g., dialog box 500) that enables the user to view the identified threats and associated status, and be given options to manage those threats. In this scenario as shown in FIG. 5 and indicated at block 632 in FIG. 6, Threat1 is shown having a status of "Suspended." As the SDA 216 specifies that this specific threat be removed, as shown at block 637, Threat1 is removed when the user activates the smart clean button 541 shown in the threat dialog box 500.

Figure 7:
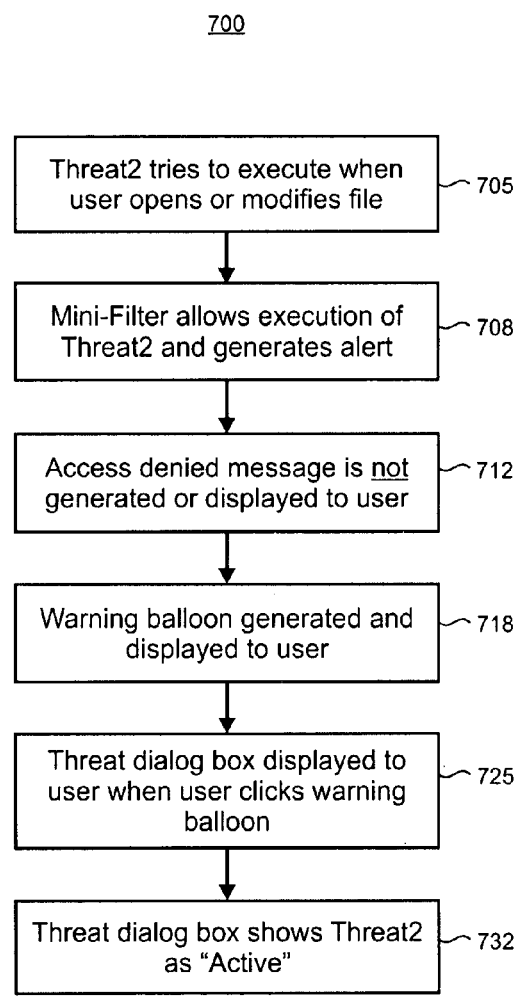
FIG. 7 is a flowchart of a second illustrative user experience scenario.

In the user experience scenario 700 shown in FIG. 7, it is assumed that Threat2 is identified as a "Low" threat by the anti-malware definitions 346, and that the SDA 216 specifies that this particular threat be subject to selective action in accordance with user or IT administrator preferences.

Threat2 tries to execute when the user opens or modifies a file, as indicated at block 705. At block 708, since the SDA does not contain a definition to suspend, the mini-filter 305 allows execution of Threat2 and generates an alert event which is passed to the anti-malware service 302. Unlike the previous scenario, the user application 316 does not generate nor display an "Access Denied" message to the user, as indicated at block 712.

At block 718, a warning balloon is provided to the user. When clicked, as indicated by reference numeral 725, the warning balloon brings up a threat dialog box (e.g., dialog box 500) that enables the user to view the identified threats and status, and be given options to manage those threats. In this scenario as shown in FIG. 5 and indicated at block 732 in FIG. 7, Threat2 is shown having a status of "Active." As the decision to suspend or remove is determined by user or IT administrator's choice in this scenario, and the SDA 216 does not specify that this specific threat be removed, Threat2 will not be removed when the user activates the smart clean button 541 shown in the threat dialog box 500. Threat2 will not be removed without additional affirmative steps being taken by the user as it is possible that the user wishes that the processes associated with Threat2 be available to run on the user's computer system.

Figure 8:
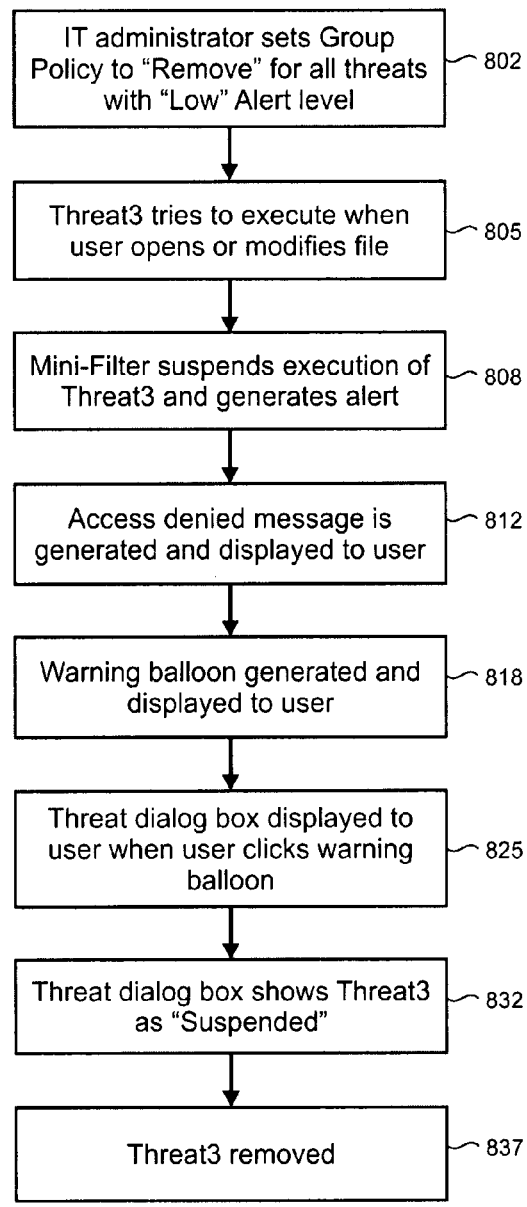
FIG. 8 is a flowchart of a third illustrative user experience scenario.

In the user experience scenario 800 shown in FIG. 8, it is assumed that Threat3 is identified as a "Low" threat by the anti-malware definitions 346, and that the SDA 216 specifies that this particular threat be subject to selective action in accordance with user or IT administrator preferences. In addition, as shown in block 802, the IT administrator has configured the group policy settings 310 in PDA 205 so that all threats having a "Low" alert level are removed.

Threat3 tries to execute when the user opens or modifies a file, as indicated at block 805. Since the SDA 216 does not contain a definition to suspend, the mini-filter 305 would typically allow execution of Threat3. However in this scenario, SDA 216 is overridden by PDA 205 and the IT administrator's preference that all low alert threats be removed according to the cascading logic hierarchy 200. Therefore, at block 808, the mini-filter 305 suspends execution of Threat3 and generates an alert event which is passed to the anti-malware service 302.

The user application 316 generates and displays an "Access Denied" message to the user, as shown at block 812. At block 818, a warning balloon is provided to the user. When clicked, as indicated by reference numeral 825, the warning balloon brings up a threat dialog box (e.g., dialog box 500) that enables the user to view the identified threats and status, and be given options to manage those threats. In this scenario as shown in FIG. 5 and indicated at block 832 in FIG. 8, Threat3 is shown having a status of "Suspended." As the PDA 216 specifies that this specific threat be removed, as shown at block 837, Threat3 is removed when the user activates the smart clean button 541 shown in the threat dialog box 500.

Figure 9:
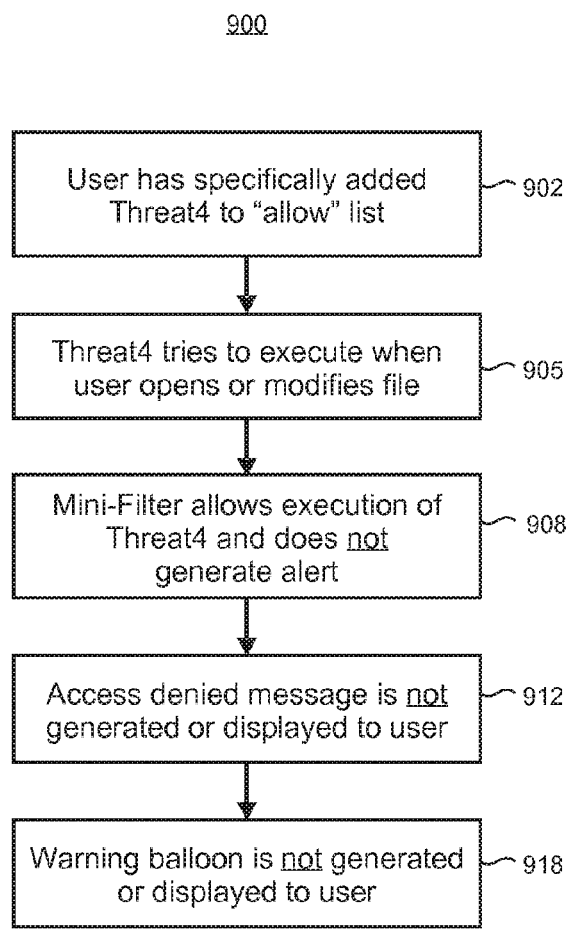
FIG. 9 is a flowchart of a fourth illustrative user experience scenario.

In the user experience scenario 900 shown in FIG. 9, it is assumed that Threat4 is identified as a "High" threat by the anti-malware definitions 346, and that the SDA 216 specifies that this particular threat be subject to quarantine. In addition, as shown in block 902, the user has specifically added Threat4 to the user's list of allowed applications as defined by the end user preferences 322 and UDA 211 even though the software is bundled with spyware.

Threat4 tries to execute when the user opens or modifies a file, as indicated at block 905. While the SDA 216 contains a definition to quarantine, the mini-filter 305 allows execution of Threat4 as the SDA 216 is overridden by UDA 205 and the user's preference that Threat4 be allowed to run. Therefore, at block 908, the mini-filter 305 allows execution of Threat4 but does not generate an alert event which is passed to the anti-malware service 302.

Figure 6:
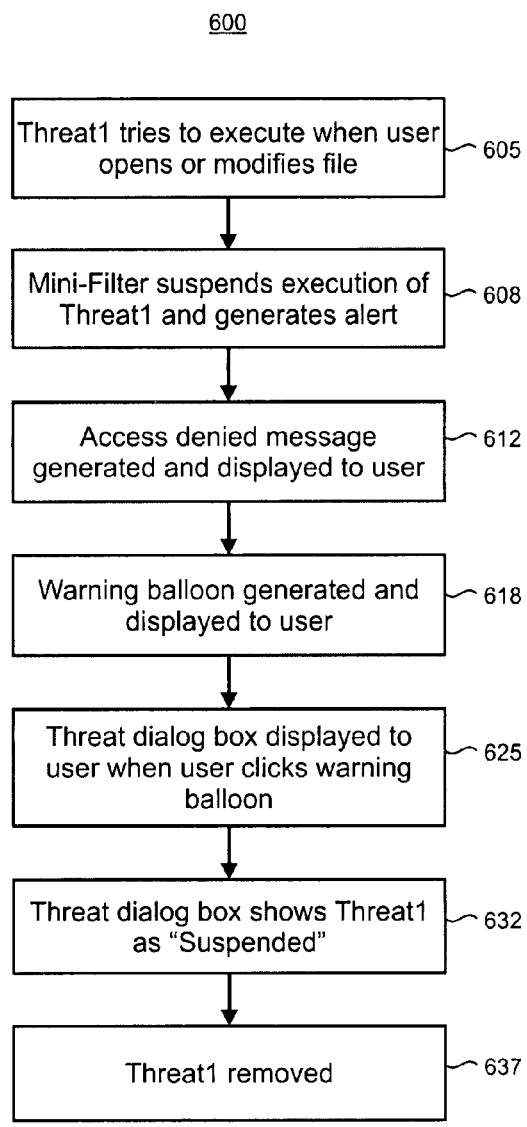
FIG. 6 is a flowchart of a first illustrative user experience scenario.

Unlike the scenario shown in FIG. 6 and described in the accompanying text, the user application 316 does not generate nor display an "Access Denied" message to the user, as indicated at block 912. The warning balloon is also not generated nor displayed to the user, as indicated at block 918. Since the user has added Threat4 to user's allowed list, Threat4 will not be removed when the user activates the smart clean button 541 shown in the threat dialog box 500. Threat4 will not be removed without additional affirmative steps being taken by the user as it is unambiguous that the user wishes that the processes associated with Threat4 be kept available on the user's computer system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method arranged for operating on a computer system, the method for dynamically handling a suspected threat, the method comprising the steps of:
    monitoring file activity to ascertain when a file is being opened or having been modified and closed;
    scanning the file, responsively to the monitoring, to identify a threat associated with the file, the threat being identified by alert level or threat level by comparing the file against a set of stored signatures; and
    applying a cascading logic hierarchy to the identified threat, the cascading logic hierarchy including a plurality of tiers, each tier in the plurality of tiers providing a configuration for the computer system that is usable for determining whether to run or suspend software embodying the threat, each higher tier in the logic hierarchy being arranged for overriding a configuration contained in a lower tier in a cascading manner, wherein the cascading logic hierarchy includes a tier which provides a policy-defined action associated with a group policy setting, the cascading logic hierarchy further includes a tier which provides a user-defined action associated with an end-user preference, wherein the policy-defined action associated with the group policy setting overrides the user-defined action associated with the end-user preference, and the cascading logic hierarchy further includes a tier which provides a signature-defined action associated with an anti-malware definition, wherein the user-defined action associated with the end-user preference overrides the signature-defined action associated with the anti-malware definition.

2. The method of claim 1 in which the scanning is performed by an engine module loaded by an anti-malware service.

3. The method of claim 1 in which the cascading logic hierarchy implements a plurality of different configurations each being applicable to different user groups, a first group of users comprising consumers, and a second group of users comprising managed users associated with an enterprise network.

4. The method of claim 1 including a further step of receiving input at a user interface that is arranged for setting end-user preferences, the end-user preferences defining a configuration in a tier of the logic hierarchy.

5. The method of claim 1 including a further step of receiving input at an administrator interface that is arranged for setting group policy settings, the group policy settings being used to define a configuration in a tier of the logic hierarchy.

6. A computer storage memory containing instructions which, when executed by one or more processors disposed in an electronic device, performs a method for managing threats embodied in software, the method comprising the steps of:
    scanning a file in a file system responsively to the file being opened, or responsively to the file being closed after having been modified, to identify a threat associated therewith using one or more threat definitions, the threat being identified by a threat level, wherein the scanning is invoked by an anti-malware service responsively to an alert event received from a file system filter manager, the file system filter manager comprises a mini-filter that executes in a kernel of an operating system of the electronic device;
    supporting a user application that provides a first user interface by which end-user preferences may be set with regard to identified processes that run as part of potentially unwanted software;
    supporting an administrator application that provides a second user interface by which group policy settings may be set with regard to i) a category of software threat, or ii) the threat level, or iii) a specific threat; and
    applying logic from a tiered hierarchy in a cascading manner to make a determination for allowing a threat to run, or for suspending the threat from running, the threat definitions, end-user preferences, and group policy settings being arranged in respective tiers of the hierarchy, wherein the tiered hierarchy includes a tier which provides a policy-defined action associated with a group policy setting, the tiered hierarchy further includes a tier which provides a user-defined action associated with an end-user preference, wherein the policy-defined action associated with the group policy setting overrides the user-defined action associated with the end-user preference, and the tiered hierarchy further includes a tier which provides a signature-defined action associated with an anti-malware definition, wherein the user-defined action associated with the end-user preference overrides the signature-defined action associated with the anti-malware definition.

7. The computer storage memory of claim 6 in which the user application communicates with the anti-malware service using a remote procedure call so as to harden the anti-malware service by creating a restricted environment in which the user application operates.

8. The computer storage memory of claim 7 in which the logic is configured to be different for different user groups, a first group of users comprising consumers, and a second group of users comprising managed users associated with an enterprise network, so that the determination is based on the threat level for the first group, and based on the category or the threat level for the second group.

9. The computer storage memory of claim 8 in which the method includes a further step of providing an interactive user interface through the user application to enable a user with visibility and control over the identified processes.

10. A system for managing potentially unwanted software, comprising:
    a computer system comprising:
    an anti-malware service including an engine module that scans a file in a file system to identify a threat contained in the file using a plurality of signatures, the scan performed responsively to an event associated with a file being opened, or responsively to an event associated with a modified file being closed;

a file system mini-filter that sends an event when a file is attempted to be opened and further sends an event when a modified file is attempted to be closed;

an end-user interface that receives and maintains end-user preferences having applicability to the potentially unwanted software;

an administrator interface that receives and maintains group policy settings having applicability to the potentially unwanted software; and a tiered logic hierarchy, the end-user preferences, group policy settings, and signatures comprising respective tiers in a portion of the logic hierarchy, and logic from the logic hierarchy being applicable to the threat in a cascading manner so as to make a determination to allow the threat to run or to suspend the threat from running, wherein the anti-malware service, end-user interface, and administrator interface run in user mode, and the file system mini-filter runs in kernel mode, wherein the tiered logic hierarchy includes a tier which provides a policy-defined action associated with a group policy setting, the tiered logic hierarchy further includes a tier which provides a user-defined action associated with an end-user preference, wherein the policy-defined action associated with the group policy setting overrides the user-defined action associated with the end-user preference, and the tiered logic hierarchy further includes a tier which provides a signature-defined action associated with an anti-malware definition, wherein the user-defined action associated with the end-user preference overrides the signature-defined action associated with the anti-malware definition.

11. The system of claim 10 in which the end-user interface provides an alert to a user when access to the file is denied.

12. The system of claim 11 in which the end-user interface displays information pertaining to an identified threat, an alert level associated with the threat, and an operational status of the threat.

13. The system of claim 12 in which the end-user interface enables the user to selectively override suspension of execution of the file through setting of the file to an allow list.

* * * * *